(12) United States Patent
Knevels et al.

(10) Patent No.: US 7,876,095 B2
(45) Date of Patent: Jan. 25, 2011

(54) APPARATUS FOR DETERMINATION OF AN INTERFACE OF A SLAG LAYER

(75) Inventors: Johan Knevels, Bree (BE); Guido Cappa, Houthalen (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 207 days.

(21) Appl. No.: 11/626,647

(22) Filed: Jan. 24, 2007

(65) Prior Publication Data

US 2007/0176334 A1    Aug. 2, 2007

(30) Foreign Application Priority Data

Jan. 26, 2006    (DE) .................. 10 2006 003 950

(51) Int. Cl.
*G01B 7/06* (2006.01)
*G01B 7/00* (2006.01)
*G01R 33/12* (2006.01)

(52) U.S. Cl. .................. 324/230; 266/94; 324/226; 324/229; 324/234

(58) Field of Classification Search .................. None
See application file for complete search history.

(56) References Cited

U.S. PATENT DOCUMENTS 5,182,565 A    1/1993  Nagamune et al.
5,781,008 A *  7/1998  Muller et al. ............... 324/230
6,670,808 B2   12/2003 Nath et al.

FOREIGN PATENT DOCUMENTS

| DE | 3133182 C1 | 1/1983 |
|----|------------|--------|
| DE | 3641987 A1 | 6/1987 |
| DE | 4402463 C2 | 1/1998 |
| JP | 2003049215 | 2/2003 |
| WO | 98/14755   | 4/1998 |
| WO | 03/060432 A1 | 7/2003 |

OTHER PUBLICATIONS

Kretschmar et al., "Capacitive and Inductive Displacement Sensors," Sensor Technology Handbook, p. 196-197, Elsevier, Boston, Dec. 2004.*
Office Action issued Aug. 27, 2010 in CN Appln. Ser. No. 200710007774.7.

* cited by examiner

*Primary Examiner*—Melvin C Mayes
*Assistant Examiner*—Colin W Slifka
(74) *Attorney, Agent, or Firm*—Panitch Schwarze Belisario & Nadel LLP

(57) ABSTRACT

An apparatus is provided for determination of at least one interface of a slag layer on top of a molten metal. The apparatus has a carrier tube and a measuring head arranged on one end of the carrier tube with a body fixed within the carrier tube and an end face facing away from the carrier tube. The apparatus further includes an oscillator arranged within the measuring head and an induction coil connected with the oscillator and arranged outside of the body and in front of its end face.

20 Claims, 2 Drawing Sheets

APPARATUS FOR DETERMINATION OF AN INTERFACE OF A SLAG LAYER

BACKGROUND OF THE INVENTION

The invention relates to an apparatus for the determination of at least one interface of a slag layer on top of a molten metal, the apparatus having a carrier tube, on whose one end a measuring head is arranged, which measuring head has a preferably cylindrical body fixed within the carrier tube and whose end face faces away from the carrier tube.

Similar apparatuses are known from German published patent application DE 36 41 987 A1, for example. Here, an induction coil is arranged within a carrier tube, in order to determine the slag height on top of steel melt. From German Patent DE 44 02 463 C2 it is known to use a first electromagnetic sensor together with a second sensor for ascertaining the slag thickness. Furthermore, a sensor for the measurement of the slag thickness is known from International application publication No. WO 98/14755, in which the slag is measured with the aid of an optical fiber. According to German Patent DE 31 33 182 C1, a metal bath level is determined with the aid of a short circuit caused by a voltage change. Japanese patent application publication JP 2003049215 discloses the determination of the slag thickness by using two induction coils. A further device for measuring the thickness of a slag layer is known from International application publication No. WO 03/060432 A1. Here, the use of an expendable electronic measuring component within the sensor is described, wherein the signals from the sensor are transmitted wirelessly to an analyzing station. It is also known to determine the slag thickness by means of microwaves (U.S. Pat. No. 5,182,565).

BRIEF SUMMARY OF THE INVENTION

The underlying objective of the present invention is to make available an improved measuring apparatus, by which a slag layer, lying on top of a molten metal, can be very exactly measured.

Within the measuring head a printed circuit board (or a circuit frame, or another device designed to accommodate electrical components) is arranged with an oscillator, and an induction coil connected with the oscillator is arranged outside the measuring body and in front of its end face. A very exact determination of the interface, for example between the slag and the molten steel lying below it, is thereby possible, because the induction coil, at least with suitable exactly adjusted electronic circuits connected downstream, very exactly detects a change at the transition from the slag to the conductive molten metal, and a corresponding signal change is very exactly coupled with the transition of the two materials. The level of the interface is correlated either with the descent rate of the measuring head, wherein the time is measured from the initiation of movement up to the signal change, or directly according to the position change of the measuring head fixed to the carrier tube (positional measurement), so that the exact position of the induction coil at the temporal point of signal change can be certainly determined. The signals are connected in the conventional manner via a contact piece with signal lines fed through a lance and connected with an analysis device. The lance is a conventional carrier lance, onto which the carrier tube for measuring is affixed and with which the carrier tube is held during measuring.

The signal change in the induction coil begins only at approximately 1 cm distance or less from the molten metal, so that environmental influences, such as interference, are avoided to the greatest extent possible. The oscillations of the oscillator are initially damped by the approach of the induction coil to the metal, and then completely suppressed by the immersion of the induction coil into the metal. A suitable signal can be transmitted as a threshold value, for example via a transistor.

Advantageously, the induction coil is enclosed, at least laterally, by a protective sheath affixed to the body of the measuring head, wherein the protective sheath can be made of cardboard, ceramic, or fused quartz. The induction coil is thereby protected from the effects of the slag. The protective sheath can be enclosed on its outer surface by a layer of cardboard, paper, or another material combustible at the temperatures prevailing directly above or within the slag layer. Such a layer prevents to the greatest extent possible, by its burn off, the adhesion of slag to the protective sheath.

In order to achieve the most exact measurement possible, the diameter of the protective sheath should be at most six times, preferably no more than three times, and most preferably no more than two times as large as the diameter of the induction coil. The distance between the induction coil and the oscillator should be at most 5 cm, preferably no more than 3 cm, so that disturbances with the environment can be minimized. A resistor can be arranged on the printed circuit board, and a contact piece can be arranged at the end of the measuring head located within the carrier tube to electrically connect the measuring head with a lance guided through the carrier tube, wherein the resistor is connected with at least one contact of the contact piece. An interconnection between two contacts, for example a short circuit, can thereby be created, as is familiar per se to a person skilled in the art, so that the analysis device connected with the lance recognizes that the measuring head has an induction coil for determining the interface, and the data output occurs in a suitable manner. This ensures that a standard lance can be used, onto which other known sensors, for example temperature sensors, can be attached for the purpose of taking other measurements. By standardizing the dimensions of the contact piece, it is possible for the resistor to guarantee the recognition of the type of sensor attached to the lance.

Advantageously, a bath contact is arranged outside the body of the measuring head, in front of its end face, the bath contact being grounded by the carrier tube and the lance connecting therethrough. This bath contact allows the additional determination of the interface between the slag layer and the gas layer lying on top of it, because a short circuit occurs as soon as the bath contact touches the slag (in a normal case, the slag itself is generally grounded). The upper as well as the lower interfaces of the slag can thereby be determined, and consequently the thickness of the slag layer can be calculated.

It is further advantageous for an A/D (analog-digital) converter connected with the oscillator to be arranged on the printed circuit board. The A/D converter is expediently connected with a signal line for further transmitting the measurement signals, wherein the A/D converter can be connected with one of the contact points arranged on the printed circuit board, to which contact point the signal line is connected. The A/D converter also advantageously has a power supply line.

If the measuring head has a contact piece electrically connected with a signal output and a power supply line of the A/V converter, and if the contact piece is connected with a lance inserted into the carrier tube and at least one signal line and at least one power supply line are arranged within the lance, which lines are connected at the one end with the contact piece and at the other end with a measuring or analytical device, the further transmission of the measurement signals from the sensors as digital signals is possible, so that electrical disturbances caused by the environment are eliminated to a large extent. Analog signals are transmitted in this manner only over very short distances, which the power supply enables to function problem free.

At the end of the protective sheath facing away from the carrier tube, it is advisable to arrange a cover, preferably made of a material consumable at molten steel temperatures, in particular made of paper or cardboard, in order to protect the induction coil from the slag. The cover burns and thereby creates for a short period a gas space, which prevents the adherence of slag during the passage through the slag layer.

In the apparatus according to the invention, all of the electronic measuring components are in principle constructed as single-use materials, which are disposed of, along with the measuring head and the carrier tube, after a single use. The measuring head can carry additional sensors, for example oxygen sensors, optical sensors, or temperature sensors, which can be connected with an electronic analysis circuit in a conventional manner via the contact piece.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
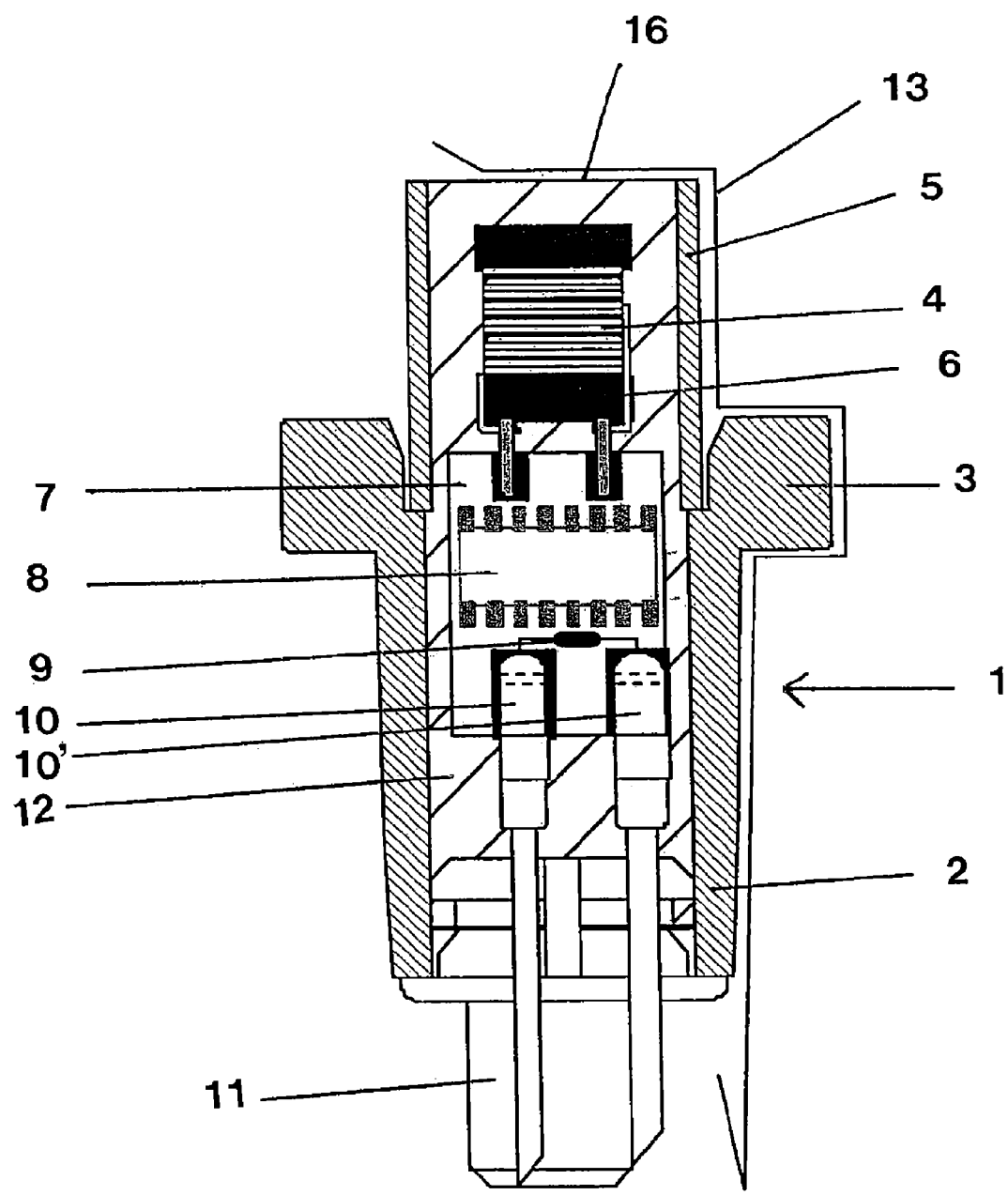
FIG. 1 is a schematic cross-sectional representation of an embodiment of a measuring head according o the invention.

The measuring head 1, represented in FIG. 1, has a cylindrical shank 2, which is inserted in a carrier tube (not shown) until the carrier tube strikes an edge of the collar 3 of the measuring head 1. A defined positioning is thereby possible. The induction coil 4 is arranged directly in front of the collar 3, outside of the measuring head 1. The induction coil 4 is laterally enclosed by a protective sheath 5 (made of cardboard or fused quartz), which can have a layer of cardboard (not shown) on its external face. The diameter of the protective sheath is approximately twice as large as the diameter of the induction coil.

On the external end face of the protective sheath a covering layer 16, made of cardboard, is arranged. The coil 4 is formed of a ferrite core 6 wrapped with copper wire. It is connected to a printed circuit board 7, which has a circuit 8 with an oscillator and an A/D converter. The printed circuit board 7 further has a resistor 9. The resistor is connected to two contact terminals 10; 10', which in turn are connected to the contact piece 11. On the contact piece a lance is arranged, whose signal lines are connected to the contact terminals of the contact piece 11, and thus in particular to the contact terminals 10; 10'. The detection of the resistance is thereby enabled, so that the technically measured monitoring of the measuring head as an apparatus for the determination of one (or more) interface(s) is possible.

With the conventional size of the measuring head 1 within the boundaries of the conventional carrier tube dimensions, the distance between the induction coil 4 and the oscillator integrated in circuit 8 is only approximately 2 cm, so that environmental influences are practically excluded. The inner cavity 12 of the measuring head as well as the interior of the protective sheath 5 are filled with cement, so that all of the sensor technical components are enclosed, stabilized, and protected by cement. The immersion end of the induction coil 4 is covered with a cement layer approximately 2-4 mm thick.

Figure 2:
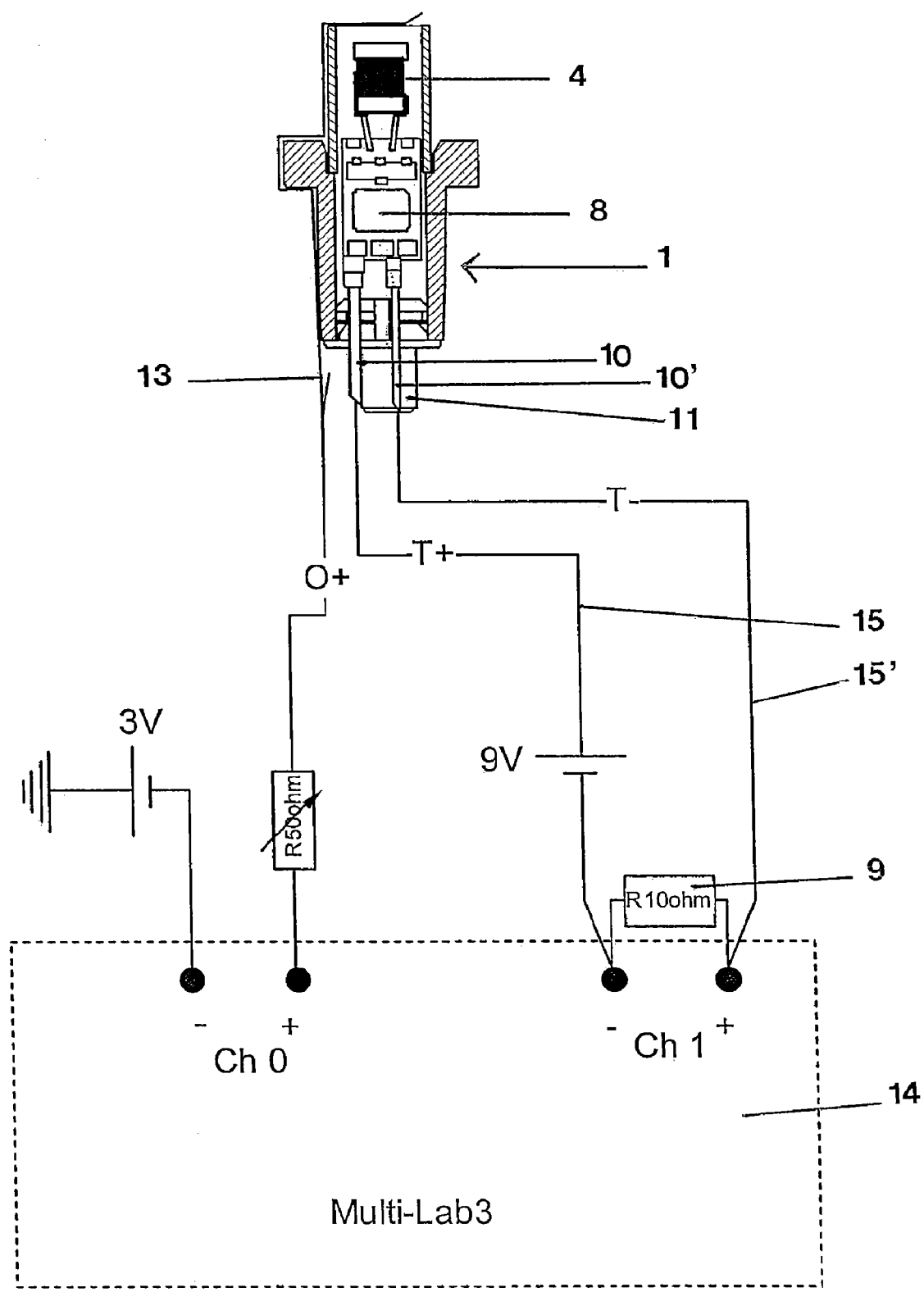
FIG. 2 is diagrammatic representation of a measuring head with a circuit arrangement according to the invention.

In front of the protective sheath 5 in the immersion direction a bath contact 13 is arranged, which lies along the outer side of the measuring head 1 and is grounded via the lance pressed onto contact piece 11 of the measuring head 1. As soon as the bath contact 13 comes into contact with the slag layer by the lowering of the apparatus, a short circuit occurs, which is detected by a computer or analysis device 14 (FIG. 2). During further lowering of the apparatus, the oscillation of the oscillator in the circuit 8 is strongly damped, as soon as the induction coil 4 very closely (approximately 1 cm) approaches the conducting surface of the molten metal, and stops when lowered further into the molten metal. This damping can be detected by a transistor, so that a corresponding voltage fluctuation can be correlated with the slag-molten metal-interface. The difference between the two signals (short circuit of the bath contact and damping of the oscillation of the oscillator) are thereby directly correlated with the corresponding positions of the apparatus during its downward movement, and the thickness of the slag layer is calculated from the difference in levels.

The signal lines 15;15', schematically represented in FIG. 2, conduct the signals from the circuit 8 to the computer or analysis device 14. These signal lines 15;15' are arranged within a conventional lance and are contacted with the measuring head 1 via the contact piece 11. In the same lance these signal lines 15;15' can also be connected with another measurement apparatus, thus via a contact piece of another measuring head, for example having a thermoelement. Further lines can also be guided through this lance, so that further sensors additionally arranged on the measuring head 1, for example a thermoelement, electro-chemical or optical sensors, can be connected with the computer or analysis device 14, so that further measurements are simultaneously possible. In addition, the further arrangement of a sample chamber in the measuring head or in the carrier tube is possible.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An apparatus for the determination of at least one interface of a slag layer on top of a molten metal, the apparatus comprising a carrier tube, a measuring head arranged on one end of the carrier tube and configured to pass through the slag layer, a shank body of the measuring head being affixed in the carrier tube and having an end face facing away from the carrier tube, an oscillator arranged inside the shank body of the measuring head, and an induction coil connected with the oscillator and arranged outside of the shank body of the measuring head in front of its end face.

2. The apparatus according to claim 1, wherein the induction coil is at least laterally enclosed by a protective sheath fixed on the shank body of the measuring head.

3. The apparatus according to claim 2, wherein the protective sheath comprises cardboard, ceramic, or fused quartz.

4. The apparatus according to claim 2, wherein the protective sheath is enclosed on its external side by a layer of combustible material.

5. The apparatus according to claim 4, wherein the layer of combustible material comprises cardboard or paper.

6. The apparatus according to claim 2, wherein a cover is arranged on an end of the protective sheath facing away from the carrier tube.

7. The apparatus according to claim 6, wherein the cover comprises a material consumable at a temperature of molten steel.

8. The apparatus according to claim 7, wherein the cover comprises paper or cardboard.

9. The apparatus according to claim 1, wherein a diameter of the protective sheath is at most six times as large as a diameter of the induction coil.

10. The apparatus according to claim 1, wherein a diameter of the protective sheath is no more than 3 times as large as a diameter of the induction coil.

11. The apparatus according to claim 1, wherein a distance between the induction coil and the oscillator is at most 5 cm.

12. The apparatus according to claim 1, wherein a distance between the induction coil and the oscillator is no more than 3 cm.

13. The apparatus according to claim 1, wherein a resistor is mounted on a printed circuit board arranged inside the measuring head, wherein the oscillator is arranged on the printed circuit board, wherein a contact piece is arranged on the shank body of the measuring head affixed in the carrier tube, the contact piece having contact terminals for electrical connection of the measuring head with a lance guided through the carrier tube, and wherein the resistor is connected with at least one contact terminal of the contact piece.

14. The apparatus according to claim 13, wherein an A/D converter connected with the oscillator is arranged within the measuring head.

15. The apparatus according to claim 14, wherein the A/D converter is arranged on the printed circuit board.

16. The apparatus according to claim 14, wherein the A/D converter is connected with a signal line for transmission of measurement signals.

17. The apparatus according to claim 14, wherein the A/D converter is connected with a contact point, to which contact point the signal line is connected.

18. The apparatus according to claim 17, wherein the contact point is arranged on the printed circuit board.

19. The apparatus according to claim 14, wherein the A/D converter has a power supply line.

20. The apparatus according to claim 1, wherein a bath contact is arranged outside of the shank body of the measuring head and in front of its end face.

* * * * *